(12) United States Patent
Zhang et al.

(10) Patent No.: US 11,527,967 B2
(45) Date of Patent: Dec. 13, 2022

(54) RHOMBOID STRUCTURED TRIBOELECTRIC NANOGENERATOR BASED ON BUILT-IN U-SHAPED SUPPORT

(71) Applicant: ZHEJIANG UNIVERSITY, Hangzhou (CN)

(72) Inventors: He Zhang, Hangzhou (CN); Zhicheng Zhang, Hangzhou (CN); Huagang Wang, Hangzhou (CN); Liwei Quan, Hangzhou (CN); Jiwei Zhang, Hangzhou (CN); Jikui Luo, Hangzhou (CN); Shurong Dong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/243,627

(22) Filed: Apr. 29, 2021

(65) Prior Publication Data
US 2021/0249972 A1 Aug. 12, 2021

Related U.S. Application Data

(63) Continuation of application No. PCT/CN2019/097712, filed on Jul. 25, 2019.

(51) Int. Cl.
*H02N 1/04* (2006.01)
(52) U.S. Cl.
CPC ..................... *H02N 1/04* (2013.01)
(58) Field of Classification Search
CPC .. H01N 1/04; H02N 1/00; H02N 2/18; H02N 1/006

(Continued)

(56) References Cited

U.S. PATENT DOCUMENTS

2014/0305211 A1 10/2014 Malvern et al.
2015/0001993 A1* 1/2015 Park .................. H02N 2/18
310/319

(Continued)

FOREIGN PATENT DOCUMENTS

CN 106549625 A 3/2017
CN 207380078 U 5/2018

(Continued)

OTHER PUBLICATIONS

International Search Report (PCT/CN2019/097712); dated Oct. 25, 2019.
JP Notice of Allowance(2021-519668); dated May 25, 2022.

*Primary Examiner* — Ahmed Elnakib
(74) *Attorney, Agent, or Firm* — W&G Law Group

(57) ABSTRACT

Provided is a rhomboid structured triboelectric nanogenerator based on a built-in U-shaped support. The device includes a diamond-shaped bracket and two U-shaped supports. The U-shaped supports is connected with the diamond-shaped bracket through four connecting rods, and the supporting plates of U-shaped supports are sequentially adhered with metal conductor layer and a dielectric material layer, which forms the power generation unit. When the diamond-shaped bracket is closed, the dielectric material layers on the two supporting plates come into contact to produce friction charge; and then subjected to the reverse force after compression of the spring, the two dielectric material layers are separated, so as to generate an induction electric field by the friction charge and form a potential difference. Compared with an existing vibration energy harvester, the advantages will be small space occupation, a long service life, simple fabrication, and a high energy conversion rate.

5 Claims, 2 Drawing Sheets

(58) Field of Classification Search
USPC .................................................. 310/309, 310
See application file for complete search history.

(56) References Cited

U.S. PATENT DOCUMENTS

2017/0331397 A1* 11/2017 Kim .................. H02N 1/04
2021/0249972 A1*  8/2021 Zhang ................ H02N 1/04

FOREIGN PATENT DOCUMENTS

| CN | 207588735 U   | 7/2018  |
|----|---------------|---------|
| CN | 109245596 A   | 1/2019  |
| JP | 2016526866 A  | 9/2016  |
| JP | 2016208816 A  | 12/2016 |

* cited by examiner

RHOMBOID STRUCTURED TRIBOELECTRIC NANOGENERATOR BASED ON BUILT-IN U-SHAPED SUPPORT

TECHNICAL FIELD

The present disclosure relates to a contact friction power generation energy harvester, and in particular, to a rhomboid structured triboelectric nanogenerator based on built-in U-shaped support.

BACKGROUND

Vibration is one of the most common mechanical movements in our daily life. It exists in human motion, bus running, bridge vibration, and so on. It is widely used in health monitoring, infrastructure monitoring, environmental protection, and public security monitoring to collect energy from mechanical vibration in environments to power electronic devices. At present, vibration energy is collected mainly based on piezoelectric effect, electromagnetic induction effect, electrostatic effect, and magnetic force control effect, and these operating modes all require the devices to operate effectively within their resonant frequency and their very narrow range. However, the vibration in the environments often has a wide spectrum distribution, and even may change over time in many cases. These factors may make the previous operating modes unable to well collect the vibration energy in the environments. Therefore, a triboelectric nanogenerator that can operate effectively within a low frequency range and a wide frequency range has a better application prospect.

SUMMARY

The technical problem to be solved by the present disclosure is to provide a rhomboid structured triboelectric nanogenerator based on a built-in U-shaped support. The device has the advantages of miniaturization, easy machining, a high output voltage, and a high energy conversion rate.

A technical solution adopted by the present disclosure to solve the technical problem is: a rhomboid structured triboelectric nanogenerator based on a built-in U-shaped support, the power generation device collecting vibration energy and converting mechanical energy into electric energy, wherein the triboelectric nanogenerator includes a diamond-shaped bracket, four edges of the diamond-shaped bracket are hinged through hinge members, and each of four inner walls of the diamond-shaped bracket is hinged to a respective one connecting rod of the four connecting rods, tail ends of two adjacent connecting rods of the four connecting rods are hinged to two ends of a first supporting plate to form a first U-shaped support, and tail ends of the other two opposite connecting rods of the four connecting rods are hinged to two ends of a second supporting plate to form a second. U-shaped support; each of the first U-shaped support of the second U-shaped support is provided with an abutting column and a insulation guide, the insulation guide is vertically fixed to the respective supporting plate, the insulation guide is provided with a spring, one end of the abutting column is fixed to the hinge member, and another end of the abutting column is inserted into the insulation guide; a metal conductor layer and a dielectric material layer are sequentially arranged on each of the first supporting plate and the second supporting plate; polarity of the dielectric material layer on the first support plate is opposite to polarity of the dielectric material layer on the second support plate; when the diamond-shaped bracket is closed, the dielectric material layer on the firs supporting plate contacts the dielectric material layer on the second supporting plate to produce friction charge, and each abutting column compresses the respective spring in the insulation guide; and then subjected to a reverse force of the spring, the diamond-shaped bracket opens, and the dielectric material layer one the first supporting plate is separated from the dielectric material layer on the second supporting plate, so as to generate an induction electric field by the friction charge and form a potential difference; and in this way, a contact friction generation unit is formed to convert the mechanical energy of vibration into electric energy.

Further, each abutting column is made of a rigid material, such that the abutting column does not bend when the diamond-shaped bracket is closed.

Further, the power generation device further includes a housing for restraining the diamond-shaped bracket to move only in a plane where the housing is located.

Further, the triboelectric nanogenerator further includes an electric energy transmission circuit including a wire and an electric storage device, and the metal conductor layer is connected to the electric storage device through the wire to charge the electric storage device.

Further, the diamond-shaped bracket and the U-shaped support are made of rubber sheets.

Further, a tail end of the insulation guide is provided with a limit structure to prevent the abutting column from being detached from the insulation guide.

Further, the insulation guide needs to be consolidated with the support plate of the U-shaped support and be always contact with the supporting column, and ensure that the abutting column is slidable in the insulation guide. This can achieve an ideal pressurization effect and obtain a larger output voltage.

The beneficial effect of the present disclosure is that a vibration-based contact electrostatic energy harvester can convert mechanical energy into electric energy and power other external electronic devices. Compared with an existing vibration energy harvester, the present disclosure has the advantages of a long service life, easy integration with other processing techniques, a higher output voltage, and a high energy conversion rate.

Figure 1:
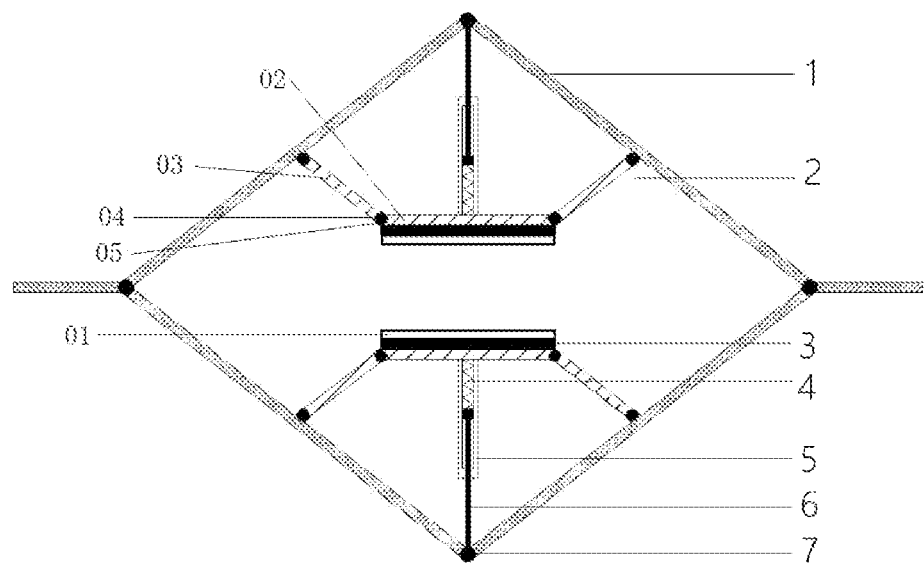
FIG. 1 is a structural diagram of a rhomboid structured triboelectric nanogenerator based on built-in u-shaped support.

Reference numerals: 1: diamond-shaped bracket; 2: U-shaped support; 3: dielectric material layer; 4: spring; 5: insulation guide; 6: abutting column; 7: hinge member; y(t): distance between dielectric material layers on upper and lower sides at time moment t.

DESCRIPTION OF EMBODIMENTS

Specific embodiments of the present disclosure are described below in further detail with reference to the accompanying drawings.

A rhomboid structured triboelectric nanogenerator based on a built-in U-shaped support as shown in FIG. 1 is applied to collection of vibration energy. The triboelectric nanogenerator includes a diamond-shaped bracket 1, four edges of the diamond-shaped bracket 1 are hinged through hinge members 7, and each of four inner walls of the diamond-shaped bracket 1 is hinged to a respective connecting rod 03. Tail ends 04 of two adjacent connecting rods 03 are hinged to two ends 05 of a first supporting plate 02 to form the U-shaped support 2, and tail ends 04 of the other two opposite connecting rods 05 are hinged to two ends of a second supporting plate 05 to form the U-shaped support 2. The U-shaped support 2 is provided with an abutting column 6 and a insulation guide 5, the insulation guide 5 is vertically fixed to the supporting plate 02, the insulation guide 5 is provided therein with a spring 4, one end of the abutting column 6 is fixed to the hinge member 7, and the other end of the abutting column 6 is inserted into the insulation guide 5. A metal conductor layer 01 and a dielectric material layer 3 are sequentially provided on the supporting plate 02. The dielectric material layers 3 on the two supporting plates 02 are of opposite polarity. When the diamond-shaped bracket 1 is closed, the dielectric material layers 3 on the two supporting plates 02 come into contact to produce friction charge, and the abutting column 6 compresses the spring 4 in the insulation guide 5. Then, subjected to the reverse force of the spring, the diamond-shaped bracket 1 opens, and the two dielectric material layers 3 are separated, so as to generate an induction electric field by the friction charge and form a potential difference. In this way, a contact friction generation unit is formed to convert the mechanical energy of vibration into electric energy.

Further, the abutting column 6 is made of a rigid material, so that the abutting column does not bend when the structure is closed.

Further, the power generation device further includes a housing for restraining the diamond-shaped bracket 1 to move only in a plane where the housing is located. The housing is generally customized according to a thickness of the diamond-shaped bracket 1.

As a common technical means in the art, the triboelectric nanogenerator further includes an electric energy transmission circuit including a wire and an electric storage device, and the metal conductor layer is connected to the electric storage device through the wire to charge a battery.

Figure 4:
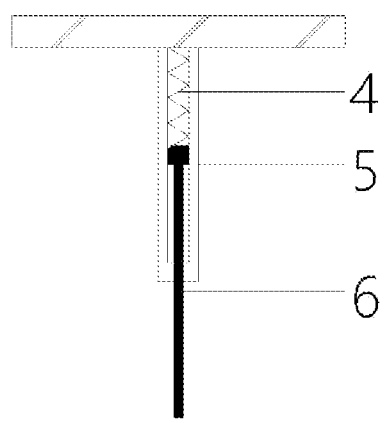
FIG. 4 is a schematic diagram of a limit structure at a tail end of a insulation guide.

The diamond-shaped bracket 1 and the U-shaped support 2 are made of rubber sheets. A tail end of the insulation guide 5 is provided with a limit structure, as shown in FIG. 4, simultaneously adopting a limit form of a step structure to prevent the abutting column 6 from being detached from the insulation guide 5.

Figure 2:
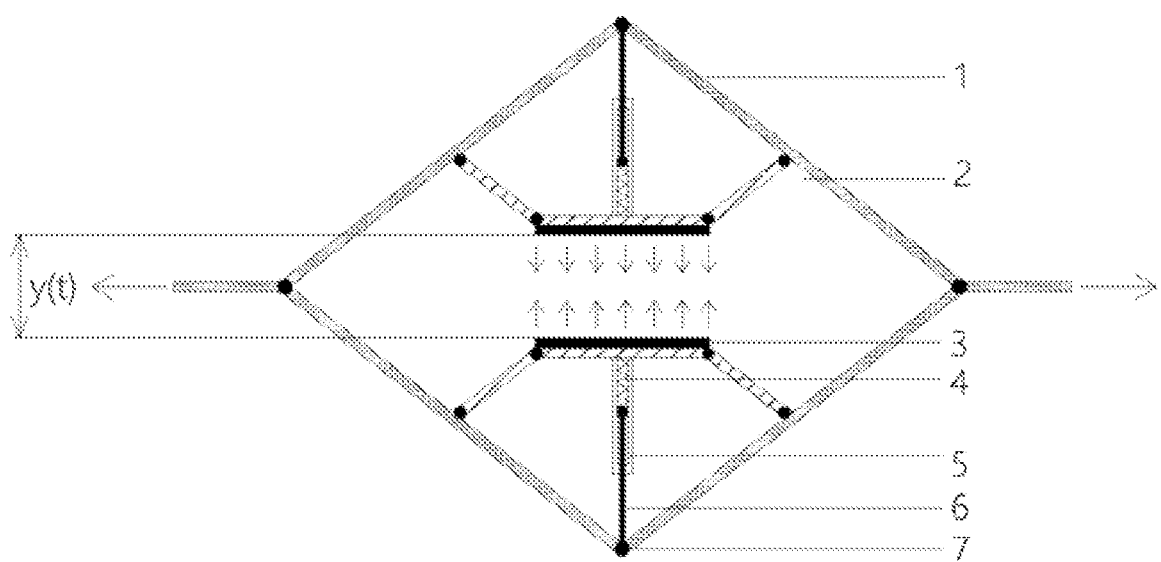
FIG. 2 is a structural diagram of an initial motion state of the rhomboid structured triboelectric nanogenerator based on built-in u-shaped support under vibration conditions.
Figure 3:
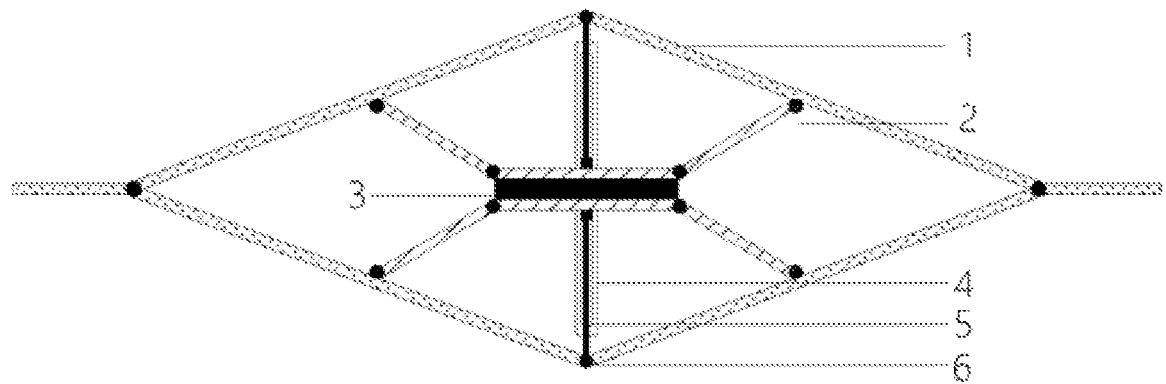
FIG. 3 is a structural diagram of a motion state in which dielectric material layers of the rhomboid structured triboelectric nanogenerator based on built-in u-shaped support are in complete contact under vibration conditions.

The principle of an assembled contact friction power generation is as follows:

Taking a cross-sectional view of a single power generation unit of a power generation device shown in FIG. 1 as an example, the direction of environmental load on the device is horizontal or vertical. In an initial state, the dielectric material layers 3 on upper and lower sides are separated from each other, as shown in FIG. 2. When the energy harvester is under the action of environmental load at a certain moment, under the action of inertia, the dielectric material layers 3 on the upper and lower sides come into contact, as shown in FIG. 3, so as to generate friction charge. The unit is then subjected to the reverse force of the spring, which causes the dielectric material layers 3 to separate. In the process, the friction charge of opposite polarity on the dielectric material layers 3 on the upper and lower sides generates an induced electric field and form a potential difference. In connection to an external circuit, a charge transfer occurs between the metal conductor layers, resulting in an electric current.

For a single contact friction power generation unit, in a static state, a distance between the dielectric material layers 3 on the upper and lower sides is maximum. Under vibration conditions, the distance between the dielectric material layers 3 on the upper and lower sides changes with the vibration, and y(t) is a distance between the dielectric material layers on the upper and lower sides at time moment t. When the contact triboelectric nanogenerator is operating, y(t) varies from the maximum to 0. When two dielectric materials come into contact (i.e., y(t)=0) and electrode plates are charged, surfaces of two electrode plates coated with a dielectric material obtain opposite static charges and have the same charge density σ (the charge density resulting from contact friction). Moreover, when the two dielectric materials are separated, the charges travel through an applied circuit to produce a current. When the load resistance is set to R, a governing equation obtained by Kirchoff's law is:

$$R\frac{dQ(t)}{dt} = -\frac{1}{C(t)}Q(t) + V(t) \quad (1)$$

where the charge quantity Q and the induction capacitance C both have the function relationship with y(t), and a boundary condition of the first-order differential equation is Q(t=0)=Q(T=0)=0. An output voltage V(t) of a single friction power generation unit can be obtained from this.

An ordinary rhomboid power generation device without a U-shaped support is compared to the rhomboid power generation device with a U-shaped support are compared in terms of output performance through an experiment. In this experiment, the same mechanical vibration source is used to exert external forces on both components. The mechanical vibration source provides a periodic external force of 1.5 Hz. Moreover, external resistances of the two power generation devices are both 100 megohm, and areas of their contact plates (composed of a substrate, a metal electrode layer, and a dielectric material layer) are both 5*5 cm. During the experiment, the output voltage of the ordinary rhombus power generation device is only 46 V, while the output voltage of the power generation device with a U-shaped support is 62 V. The output voltage is increased by 35%.

What is claimed is:

1. A rhomboid structured triboelectric nanogenerator based on built-in U-shaped support, the rhomboid structured triboelectric nanogenerator collecting vibration energy and converting vibration energy into electric energy, wherein the rhomboid structured triboelectric nanogenerator comprises a diamond-shaped bracket, four edges of the diamond-shaped bracket are hinged through hinge members, and each of four inner walls of the diamond-shaped bracket is hinged to a respective one connecting rod of four connecting rods; tail ends of two adjacent connecting rods of the four connecting rods are hinged to two ends of a first supporting plate to form a first U-shaped support, and tail ends of the other two opposite connecting rods of the four connecting rods are hinged to two ends of a second supporting plate to form a second U-shaped support; each of the first U-shaped support and the second U-shaped support is provided with an abutting column and a insulation guide, the insulation guide is vertically fixed to the respective supporting plate, the insulation guide is provided with a spring, one end of the abutting column is fixed to the hinge member, and another end of the abutting column is inserted into the insulation guide; a metal conductor layer and a dielectric material layer are sequentially arranged on each of the first supporting plate and the second supporting plate; polarity of the dielectric material layer on the first support plate is opposite to polarity of the dielectric material layer on the second support plate; when the diamond-shaped bracket is closed, the dielectric material layer on the first supporting plate contacts the dielectric material layer on the second supporting plate to produce friction charge, and each abutting column compresses the respective spring in the respective insulation guide; and then subjected to a reverse force of the spring, the diamond-shaped bracket opens, and the dielectric material layer on the first supporting plate is separated from the dielectric material layer on the second supporting plate, so as to generate an induction electric field by the friction charge and form a potential difference, such that vibration energy is converted into electric energy.

2. The rhomboid structured triboelectric nanogenerator according to claim 1, wherein each abutting column is made of a material, that allows the abutting column not to bend when the diamond-shaped bracket is closed.

3. The rhomboid structured triboelectric nanogenerator according to claim 1, wherein the triboelectric nanogenerator further comprises an electric energy transmission circuit comprising a wire and an electric storage device, and the metal conductor layer is connected to the electric storage device through the wire to charge the electric storage device.

4. The rhomboid structured triboelectric nanogenerator according to claim 1, wherein the diamond-shaped bracket and the U-shaped support are made of rubber sheets.

5. The rhomboid structured triboelectric nanogenerator according to claim 1, wherein a tail end of the insulation guide is provided with a limit structure to prevent the abutting column from being detached from the insulation guide.

\* \* \* \* \*